(12) United States Patent
Zhao et al.

(10) Patent No.: US 11,803,281 B2
(45) Date of Patent: Oct. 31, 2023

(54) TOUCH DISPLAY SCREEN AND DRIVING METHOD THEREFOR, AND DISPLAY APPARATUS

(71) Applicants: Beijing BOE Optoelectronics Technology Co., Ltd., Beijing (CN); BOE Technology Group Co., Ltd., Beijing (CN)

(72) Inventors: Tielei Zhao, Beijing (CN); Jie Yu, Beijing (CN); Pengtao Li, Beijing (CN); Daekeun Yoon, Beijing (CN); Qing Ma, Beijing (CN); Rui Han, Beijing (CN); Dong Cui, Beijing (CN); Yangyang Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/639,165

(22) PCT Filed: Feb. 26, 2021

(86) PCT No.: PCT/CN2021/078096
§ 371 (c)(1),
(2) Date: Feb. 28, 2022

(87) PCT Pub. No.: WO2021/185052
PCT Pub. Date: Sep. 23, 2021

(65) Prior Publication Data
US 2022/0326810 A1    Oct. 13, 2022

(30) Foreign Application Priority Data

Mar. 18, 2020   (CN) .......................... 202010192264.7

(51) Int. Cl.
*G06F 3/044* (2006.01)
*G06F 3/041* (2006.01)

(52) U.S. Cl.
CPC .......... *G06F 3/0446* (2019.05); *G06F 3/0443* (2019.05); *G06F 3/04164* (2019.05)

(58) Field of Classification Search
None
See application file for complete search history.

(56) References Cited

U.S. PATENT DOCUMENTS

2012/0044198 A1   2/2012   Chai et al.
2016/0334934 A1*  11/2016  Mo .................... G06F 3/04166
(Continued)

FOREIGN PATENT DOCUMENTS

CN   105353918 A  *  2/2016
CN   106527820 A     3/2017
(Continued)

OTHER PUBLICATIONS

International Search Report, dated Jun. 3, 2021, from Patent Application PCT/CN2021/078096.
(Continued)

*Primary Examiner* — Duane N Taylor, Jr.
(74) *Attorney, Agent, or Firm* — Workman Nydegger

(57) ABSTRACT

Provided are a touch display screen and a driving method therefor, and a display apparatus. A common electrode layer is divided into a plurality of mutually independent self-capacitance electrodes, and the self-capacitance electrodes are connected to a driving chip via corresponding touch-control traces; and each self-capacitance electrode is connected to a common voltage line via a switching transistor, and a gate electrode of each switching transistor is connected to a control line.

12 Claims, 8 Drawing Sheets

(56) References Cited

U.S. PATENT DOCUMENTS

| | | | |
|---|---|---|---|
| 2016/0335973 A1* | 11/2016 | Chung | G09G 3/3688 |
| 2016/0357283 A1* | 12/2016 | Xu | G02F 1/133308 |
| 2017/0038887 A1* | 2/2017 | Zhang | G02F 1/1333 |
| 2017/0220153 A1* | 8/2017 | Koide | G06F 3/041662 |
| 2018/0217694 A1* | 8/2018 | Zhang | G06F 3/0412 |
| 2020/0186631 A1 | 6/2020 | Ye | |

FOREIGN PATENT DOCUMENTS

| | | | | |
|---|---|---|---|---|
| CN | 106652870 A | | 5/2017 | |
| CN | 106919287 A | | 7/2017 | |
| CN | 106981252 A | | 7/2017 | |
| CN | 107123387 A | | 9/2017 | |
| CN | 108491109 A | * | 9/2018 | G06F 3/0412 |
| CN | 109639853 A | | 4/2019 | |

OTHER PUBLICATIONS

Chinese Office Action dated Dec. 19, 2022, from Chinese App. No. 202010192264.7.

* cited by examiner

TOUCH DISPLAY SCREEN AND DRIVING METHOD THEREFOR, AND DISPLAY APPARATUS

CROSS REFERENCE TO RELATED APPLICATIONS

The disclosure is a US National Stage of International Application No. PCT/CN2021/078096, filed on Feb. 26, 2021, which claims priority to the Chinese Patent Application No. 202010192264.7, filed to the China Patent Office on Mar. 18, 2020 and entitled "TOUCH DISPLAY SCREEN AND DISPLAY APPARATUS", the entire contents of which are incorporated herein by reference.

FIELD

The disclosure relates to the technical field of touch display, in particular to a touch display screen and a driving method therefor, and a display apparatus.

BACKGROUND

With rapid development of a display technology, a touch screen panel has gradually prevailed all over people's lives. At present, the touch screen panel may be divided according to a composition into: an add on mode touch panel, an on cell touch panel and an in cell touch panel. The add on mode touch panel is a liquid crystal display with a touch function by separately producing a touch screen panel and a liquid crystal display (LCD) and then laminating them together, and has defects of being high in fabrication cost and low in light transmittance, having a thick module and the like. As for the in cell touch panel, its touch electrode is embedded into the liquid crystal display so that a whole thickness of a module, the fabrication cost of the touch screen panel can be greatly reduced, and thus it is preferred by all major panel manufacturers.

SUMMARY

A touch display screen provided by an embodiment of the disclosure includes:
a driving chip;
a common electrode layer, partitioned into a plurality of mutually independent self-capacitance electrodes, where the self-capacitance electrodes are electrically connected to the driving chip through corresponding touch wires;
a common voltage line, electrically connected with the driving chip;
a control line, electrically connected with the driving chip; and
a plurality of switching transistors, where first electrodes of the plurality of switching transistors are electrically connected with the self-capacitance electrodes correspondingly, a gate electrode of each of the switching transistors is electrically connected with the control line, and a second electrode of each of the switching transistors is electrically connected with the common voltage line.

Optionally, in the touch display screen provided by the embodiment of the disclosure, the touch display screen includes a display region and a bezel region; the self-capacitance electrodes are located in the display region; and the switching transistors, the common voltage line and the control line are located in the bezel region; and the touch display screen further includes first fanout lines which are in one-to-one correspondence with the self-capacitance electrodes, and the self-capacitance electrodes are electrically connected with the first electrodes of the corresponding switching transistors through the first fanout lines.

Optionally, in the touch display screen provided by the embodiment of the disclosure, the switching transistors are located on the same side of the bezel region.

Optionally, in the touch display screen provided by the embodiment of the disclosure, the switching transistors are located on a side opposite to the driving chip; and
the touch wires are multiplexed as the first fanout lines.

Optionally, in the touch display screen provided by the embodiment of the disclosure, the switching transistors corresponding to the self-capacitance electrodes are respectively located on a side of the bezel region close to the self-capacitance electrodes.

Optionally, in the touch display screen provided by the embodiment of the disclosure, extending directions of the first fanout lines are the same and the first fanout lines are arranged on the same layer.

Optionally, in the touch display screen provided by the embodiment of the disclosure, the touch display screen includes a display region and a bezel region, the self-capacitance electrodes are located in the display region, and each of the switching transistors is respectively located in a region where the corresponding self-capacitance electrode is located;
the common voltage line and the control line are both located in the bezel region; and
the touch display screen further includes second fanout lines which are in one-to-one correspondence with the second electrodes of the switching transistors, and the second electrodes of the switching transistors are electrically connected with the common voltage line through the corresponding second fanout lines.

Optionally, in the touch display screen provided by the embodiment of the disclosure, extending directions of the second fanout lines are the same, and the second fanout lines are arranged on the same layer.

Optionally, in the touch display screen provided by the embodiment of the disclosure, extending directions of the second fanout lines and extending directions of the touch wires are the same, and the second fanout lines and the touch wires are arranged on the same layer.

Optionally, the touch display screen provided by the embodiment of the disclosure further includes: a voltage following circuit located between the common voltage line and the driving chip; and
the driving chip is electrically connected with the common voltage line through the voltage following circuit.

Optionally, in the touch display screen provided by the embodiment of the disclosure, the driving chip is further configured to provide a touch driving signal for the common voltage line when the touch display screen performs touch.

Correspondingly, an embodiment of the disclosure further provides a display apparatus, including any above touch display screen provided by the embodiment of the disclosure.

Correspondingly, an embodiment of the disclosure further provides a driving method for the above touch display screen, including:
controlling, by a driving chip, each switching transistor to be conducted through a control line, and providing a common voltage signal for a common voltage line and each touch wire when the touch display screen performs displaying; and controlling, by the driving chip, each switching transistor to be cut off through the control line, providing a touch driving signal for each touch wire and detecting a change of a capacitance value of each self-capacitance electrode through each touch wire so as to determine a touch position when the touch display screen performs touch.

Optionally, the driving method provided by the embodiment of the disclosure further includes:

providing, by the driving chip, a touch driving signal for the common voltage line when the touch display screen performs touch.

DETAILED DESCRIPTION OF THE EMBODIMENTS

Figure 1:
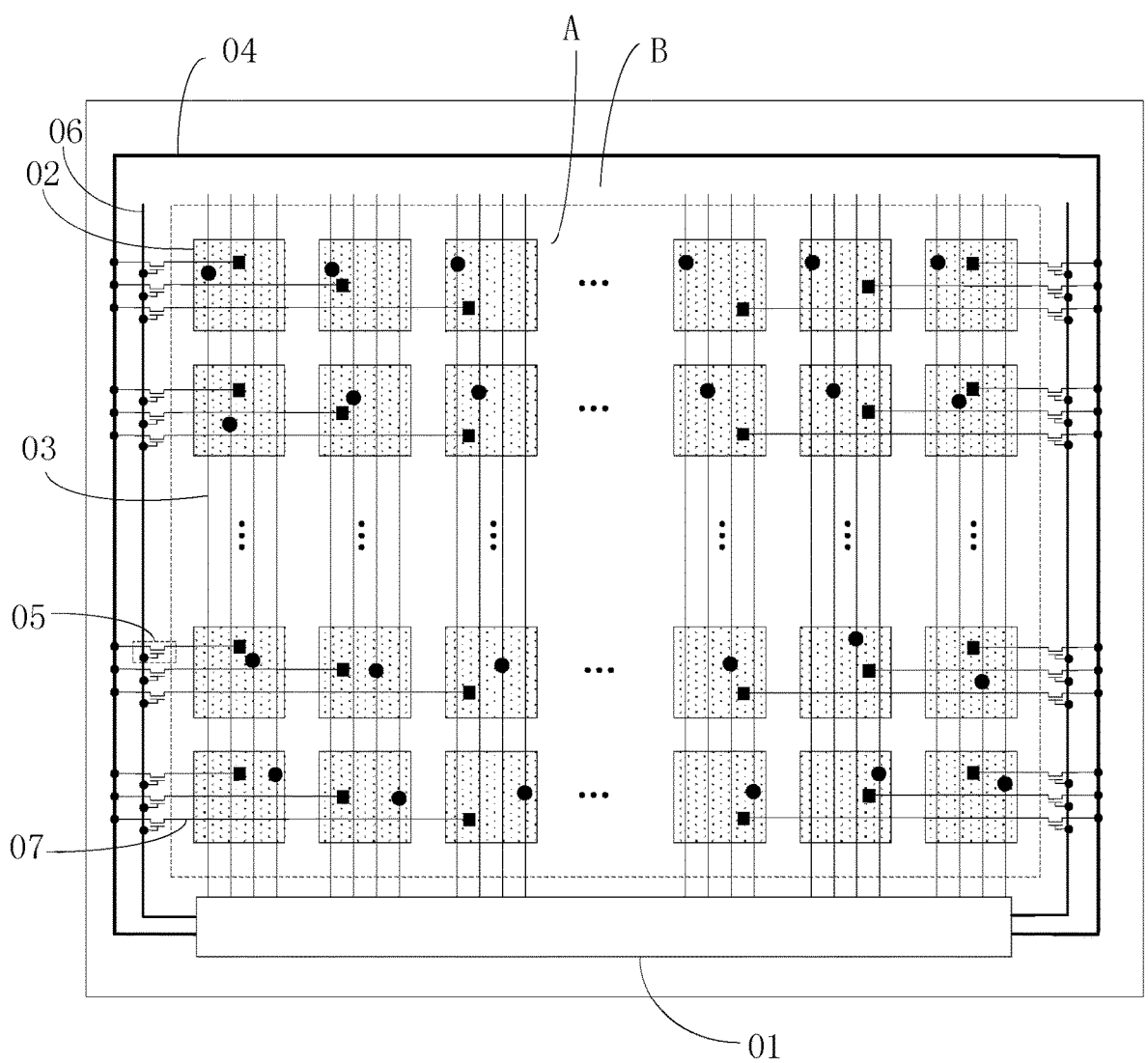
FIG. 1 is a schematic structural diagram of a touch display screen provided by an embodiment of the disclosure.

At present, an in cell touch screen panel is widely applied to the field of small sizes such as a mobile phone, a smart watch, etc. However, when an existing in cell touch screen panel is applied to a large-size display product, for example, a 12.3-inch vehicle display screen, etc. It is discovered that during displaying, there is a problem of a non-uniform picture, and even a worse problem of occurring of small checks, cross stripes, etc. Through the research, it is discovered that this is due to the fact that a common electrode in a liquid crystal panel of the existing in cell touch screen panel is partitioned into a plurality of mutually independent self-capacitance electrodes; during displaying, a common voltage is applied to the self-capacitance electrodes; during performing touch, a touch driving signal is applied to the self-capacitance electrodes; the different self-capacitance electrodes are electrically connected with a driving chip through different conducting wires; and during displaying, RC loading of the different self-capacitance electrodes are different.

Based on this, embodiments of the disclosure provide a touch display screen and a driving method therefor, and a display apparatus so as to solve the problem of non-uniform display in the related art.

In order to make the above objectives, features and advantages of the disclosure clearer and more understandable, the disclosure will be further set forth below with reference to the accompanying drawings and embodiments. However, exemplary implementations can be implemented in various forms but are not supposed to be constructed as being limited to the implementations described herein, rather, these implementations are provided to make the disclosure more comprehensive and complete, and a concept of the exemplary implementations is comprehensively conveyed to those skilled in the art. The same reference numbers in the drawings represent the same or similar structures, so their repeated description is omitted. Words denoting positions and directions described in the disclosure are set forth by taking the drawings for example, but changes can be made as required and fall within the protection scope of the disclosure. The drawings of the disclosure are only used for illustrating a relative position relation rather than represent a true scale.

It needs to be noted that specific details are set forth in the following description so as to fully understand the disclosure. However, the disclosure can be implemented in various other modes different from those described herein, and those skilled in the art can make similar popularization without departing from an intention of the disclosure. Therefore, the disclosure is not limited by specific implementations disclosed below. The following description of the specification is preferred implementations of the disclosure but only intends to describe a general principle of the disclosure instead of limiting the scope of the disclosure. The protection scope of the disclosure is defined by the appended claims.

A touch display screen and a driving method therefor, and a display apparatus provided by embodiments of the disclosure are specifically described below with reference to the drawings.

A touch display screen provided by embodiments of the disclosure, as shown in FIG. 1, including: a driving chip 01 and a common electrode layer;

the common electrode layer is partitioned into a plurality of mutually independent self-capacitance electrodes 02, and the self-capacitance electrodes 02 are electrically connected to the driving chip 01 through corresponding touch wires 03;

the touch display screen further includes: a common voltage line 04, switching transistors 05 electrically connected with the self-capacitance electrodes 02 correspondingly, and a control line 06 electrically connected with a gate electrode of each of the switching transistors 05; and the self-capacitance electrodes 02 are electrically connected with the common voltage line 04 through the corresponding switching transistors 05, namely, first electrodes of the plurality of switching transistors 05 are electrically connected with the self-capacitance electrodes 02 correspondingly, and second electrodes of the switching transistors 05 are electrically connected with the common voltage line 04.

Correspondingly, a driving method of the above touch display screen provided by embodiments of the disclosure includes the following:

a driving chip 01 controls each switching transistor 05 to be conducted through a control line 06, and provides a common voltage signal for the common voltage line 04 and each touch wire 03 when the touch display screen performs displaying; and the driving chip 01 controls each switching transistor 05 to be cut off through the control line 06, provides a touch driving signal for each touch wire 03 and detects a change of a capacitance value of each self-capacitance electrode 02 through each touch wire 03 so as to determine a touch position when the touch display screen performs touch.

Specifically, according to the touch display screen and the driving method therefor provided by the embodiments of the disclosure, when the touch display screen performs displaying, the driving chip controls each switching transistor to be conducted through the control line so that all the self-capacitance electrodes can be connected in series to form a whole; and the common voltage signal is provided for the common voltage line and each touch wire so that the common voltage signal on the different self-capacitance electrodes can be consistent and displaying uniformity can be guaranteed. When the touch display screen performs touch, the driving chip controls each switching transistor to be cut off through the control line so that all the self-capacitance electrodes can be mutually independent, provides the touch driving signal for each touch wire, and detects the change of the capacitance value of each self-capacitance electrode through each touch wire so as to determine the touch position.

The touch display screen provided by the embodiments of the disclosure does not need an extra film layer, patterns of the corresponding self-capacitance electrodes are formed only by performing a patterning process on the common electrode layer originally set as a whole layer, the production cost is reduced, and the production efficiency is improved.

According to the touch display screen provided by the embodiments of the disclosure, when the touch display screen performs touch, the driving chip provides the touch driving signal for each touch wire, and the change of the capacitance value of each self-capacitance electrode is detected through each touch wire so as to determine the touch position. A specific principle is: when a human body does not touch the screen, a capacitance born by each self-capacitance electrode is a fixed value; and when the human body touches the screen, a capacitance born by the corresponding self-capacitance electrodes is a fixed value plus a human body capacitance, and the driving chip can determine the touch position by detecting the change of the capacitance value of each self-capacitance electrode in a time sequence period of performing touch.

During specific implementation, the driving chip can apply the touch driving signal to the self-capacitance electrodes at the same time, or apply the touch driving signal to the self-capacitance electrodes row by row, which is not limited herein. Specifically, the touch driving signal is generally a square signal.

Optionally, the touch display screen provided by the embodiment of the disclosure, as shown in FIG. 1, generally includes a display region A and a bezel region B (a dotted line is a boundary between them); all the self-capacitance electrodes 02 are located in the display region A; and all the switching transistors 05, the common voltage line 04 and the control lines 06 are located in the bezel region B of the touch display screen.

The touch display screen further includes first fanout lines 07 which are in one-to-one correspondence with all the self-capacitance electrodes 02, and the self-capacitance electrodes 02 are electrically connected with the corresponding switching transistors 05 through the first fanout lines 07.

The first electrodes of the switching transistors 05 are electrically connected with the first fanout lines 07, and the second electrodes of the switching transistors 05 are electrically connected with the common voltage line 04.

During specific implementation, the first electrode of each of the switching transistors may be a source electrode, the second electrode of each of the switching transistors may be a drain electrode; and certainly, the first electrode of each of the switching transistors may be the drain electrode, and the second electrode of each of the switching transistors may be the source electrode, which is not limited herein.

According to the above touch display screen provided by the embodiments of the disclosure, the switching transistors 05, the common voltage line 04 and the control lines 06 are located in the bezel region B of the touch display screen so as not to occupy the area of the display region, and thus an aperture ratio of the touch display screen is guaranteed.

Figure 2:
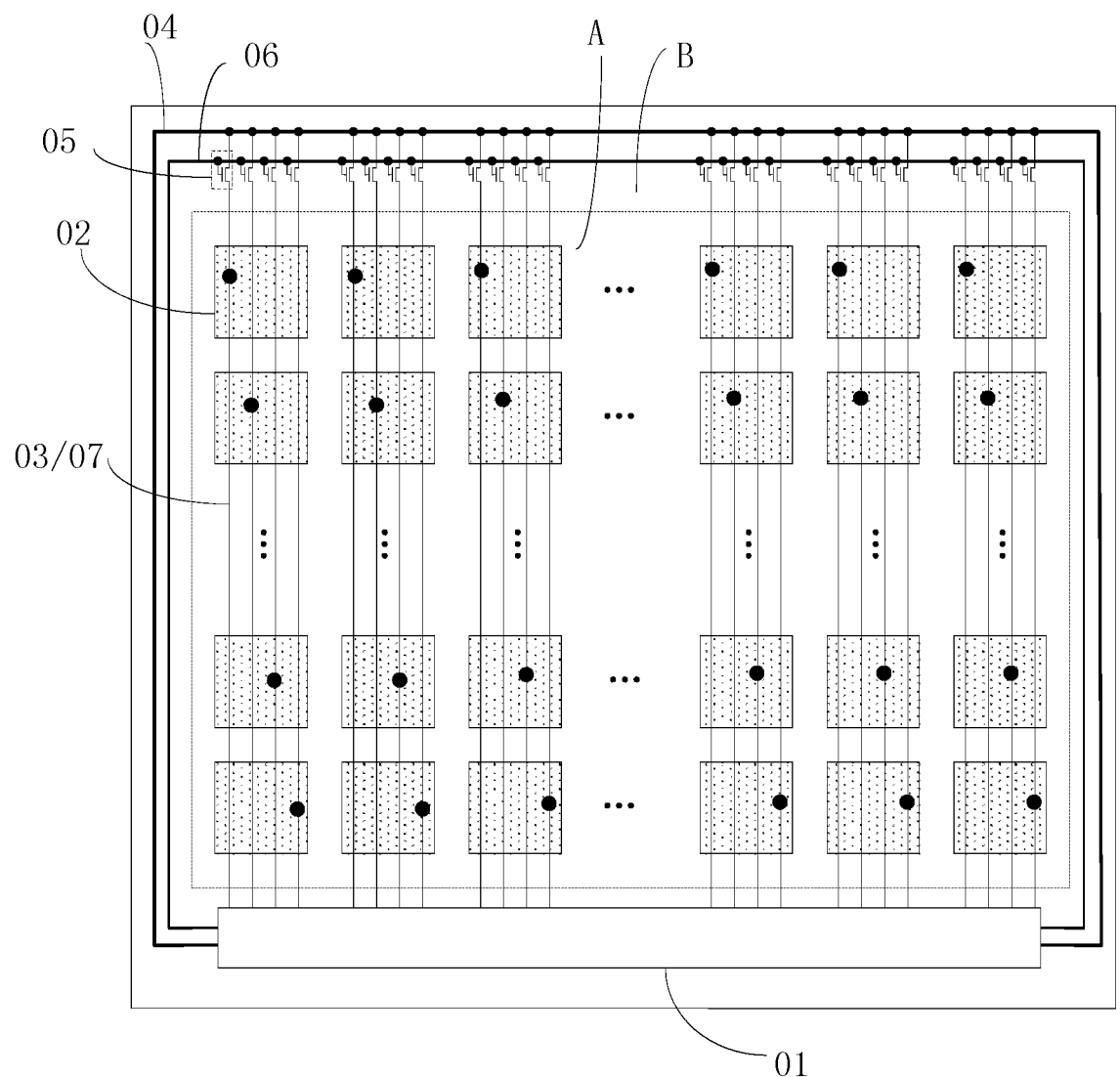
FIG. 2 is another schematic structural diagram of a touch display screen provided by an embodiment of the disclosure.

Optionally, in the touch display screen provided by the embodiment of the disclosure, as shown in FIG. 2, all the switching transistors 05 may be located on the same side of the bezel region B. In this way, the switching transistors 05 occupies only one side of a bezel, and all the switching transistors 05 are located on the same side of the bezel region B, so that distribution of the control lines 06 electrically connected with the switching transistors 05 may be centralized, and thus a bezel width is further reduced.

During specific implementation, in the touch display screen provided by the embodiment of the disclosure, as shown in FIG. 1 and FIG. 2, touch wires 03 extend from one side opposite to the driving chip 01 to one side provided with the driving chip 01 to be electrically connected with the driving chip 01.

Optionally, in the touch display screen provided by the embodiment of the disclosure, as shown in FIG. 2, all the switching transistors 05 may be located on one side opposite to the driving chip 01, and the touch wires 03 are multiplexed as the first fanout lines 07.

During specific implementation, in general, a requirement for a width of one side of the bezel region opposite to the driving chip 01 in the touch display screen is lower, so if the switching transistors 05 are arranged in this side of the bezel region, an influence on a requirement of a whole appearance of the touch display screen is small.

On the other hand, the touch wires 03 are multiplexed as the first fanout lines 07, so a fabrication process of the first fanout lines 07 does not need to be added independently, process steps are simplified, the production cost is reduced, and the production efficiency is improved. Besides, the situation that the first fanout lines 07 are independently arranged and occupy the area of the display region, and consequently, a pixel aperture ratio of the touch display screen is affected is avoided.

Figure 3:
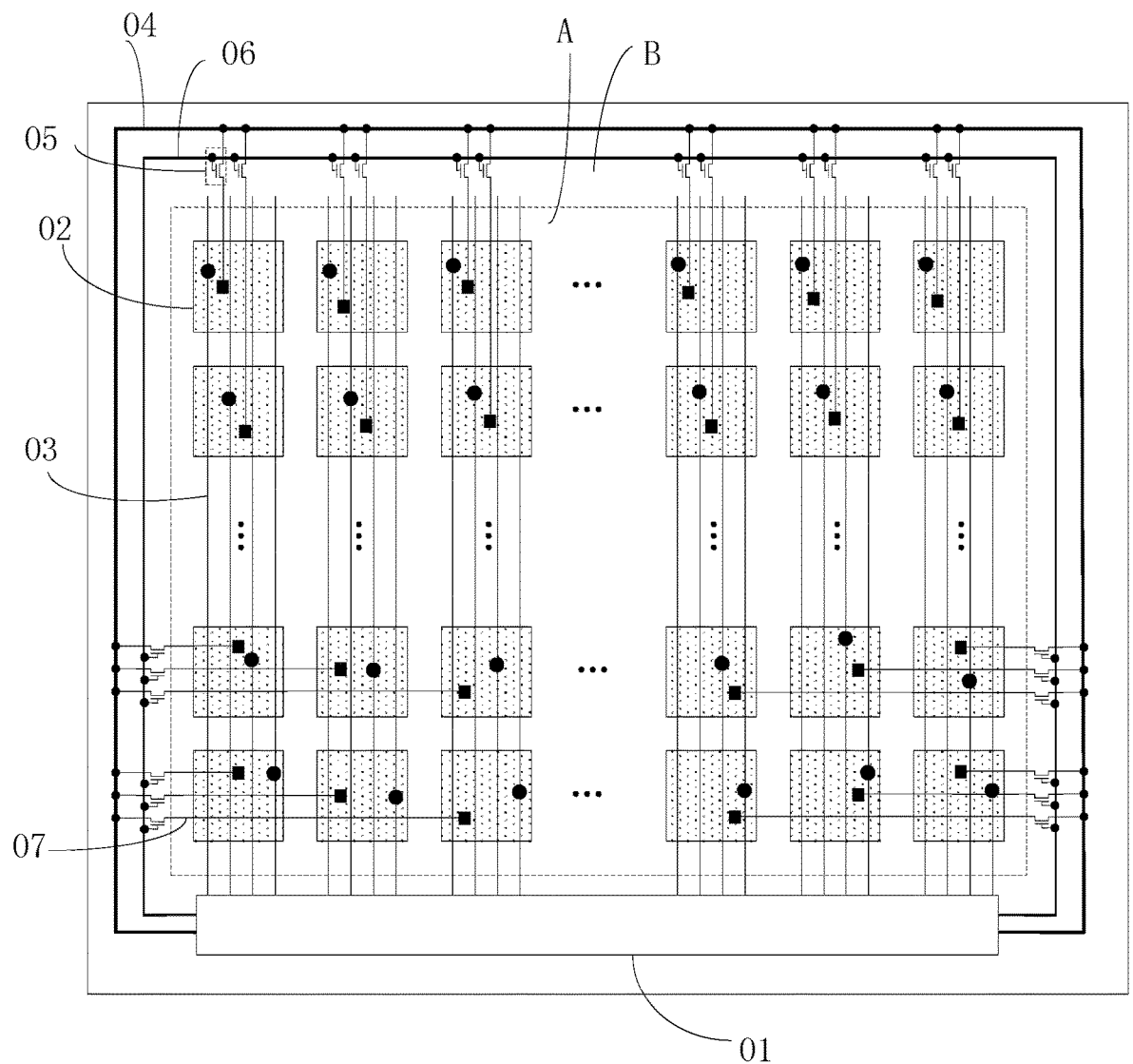
FIG. 3 is another schematic structural diagram of a touch display screen provided by an embodiment of the disclosure.

Optionally, in the touch display screen provided by the embodiment of the disclosure, as shown in FIG. 3, the switching transistors 05 corresponding to the self-capacitance electrodes 02 are respectively located on sides, close to the bezel region B, of the self-capacitance electrodes 02 electrically connected therewith. In this way, a distance between each of the first fanout lines 07 and the corresponding self-capacitance electrode 02 can be reduced, so that an occupying area of the first fanout lines 07 in the display region A can be reduced, and the pixel aperture ratio can be increased.

Optionally, in the touch display screen provided by the embodiment of the disclosure, as shown in FIG. 1, extending directions of all the first fanout lines 07 are the same, and the first fanout lines are arranged on the same layer. Accordingly, during fabrication, all the first fanout lines 07 may be fabricated on the same layer, the process steps are simplified, the production cost is reduced, and the production efficiency is improved.

Figure 4:
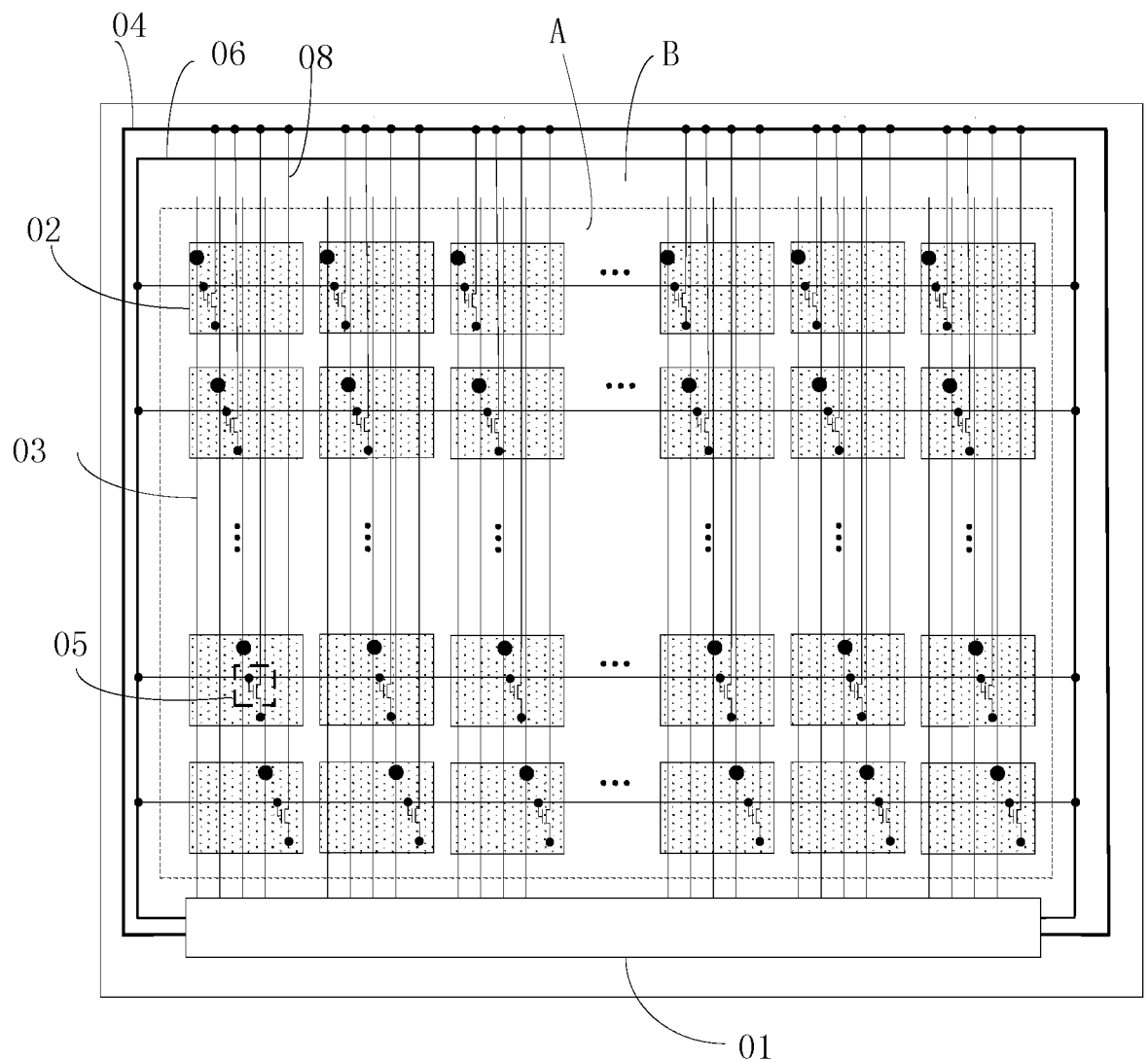
FIG. 4 is another schematic structural diagram of a touch display screen provided by an embodiment of the disclosure.

Optionally, in the touch display screen provided by the embodiment of the disclosure, as shown in FIG. 4, all the switching transistors 05 may be respectively located in regions where the corresponding self-capacitance electrodes 02 are located;

the control lines 06 and the common voltage line 04 are located in the bezel region B of the touch display screen; and the touch display screen further includes second fanout lines 08 which are in one-to-one correspondence with all the switching transistors 05, and the second electrodes of the switching transistors 05 are electrically connected with the common voltage line 04 through the corresponding second fanout lines 08.

In the above touch display screen provided by the embodiments of the disclosure, all the switching transistors 05 are arranged in the display region of the touch display screen so that increase of the bezel width can be avoided.

Optionally, in the touch display screen provided by the embodiment of the disclosure, as shown in FIG. 4, extending directions of all the second fanout lines 08 are the same, and the second fanout lines are arranged on the same layer. In this way, during fabrication, all the second fanout lines 08 may be fabricated on the same layer, process steps are simplified, the production cost is reduced, and the production efficiency is improved.

Besides, optionally, in the touch display screen provided by the embodiment of the disclosure, as shown in FIG. 4, extending directions of the second fanout lines 08 and extending directions of the touch wires 03 are the same, and the second fanout lines and the touch wires are arranged on the same layer. In this way, during fabrication, a fabrication process of the second fanout lines 08 does not need to be added independently, the second fanout lines can be realized only by changing patterning of corresponding film layers of original touch wires 03, the process steps are simplified, the production cost is reduced, and the production efficiency is improved.

Figure 5:
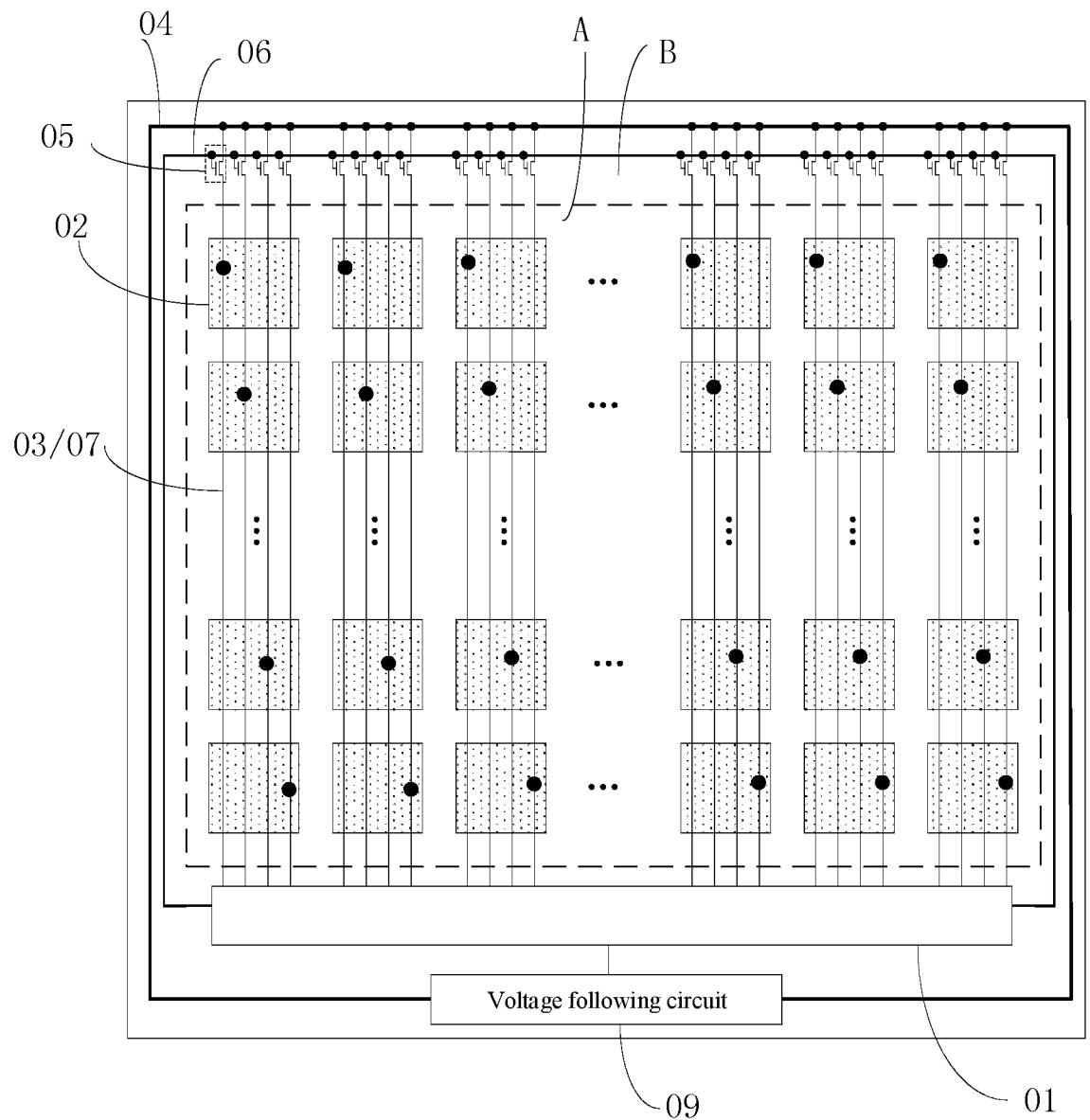
FIG. 5 is another schematic structural diagram of a touch display screen provided by an embodiment of the disclosure.

Optionally, the touch display screen provided by the embodiment of the disclosure, as shown in FIG. 5, further includes: a voltage following circuit 09 located between the common voltage line 04 and the driving chip 01. The driving chip 01 is electrically connected with the common voltage line 04 through the voltage following circuit 09. Accordingly, driving capacity of the driving chip 01 is enhanced through the voltage following circuit 09.

Figure 6:
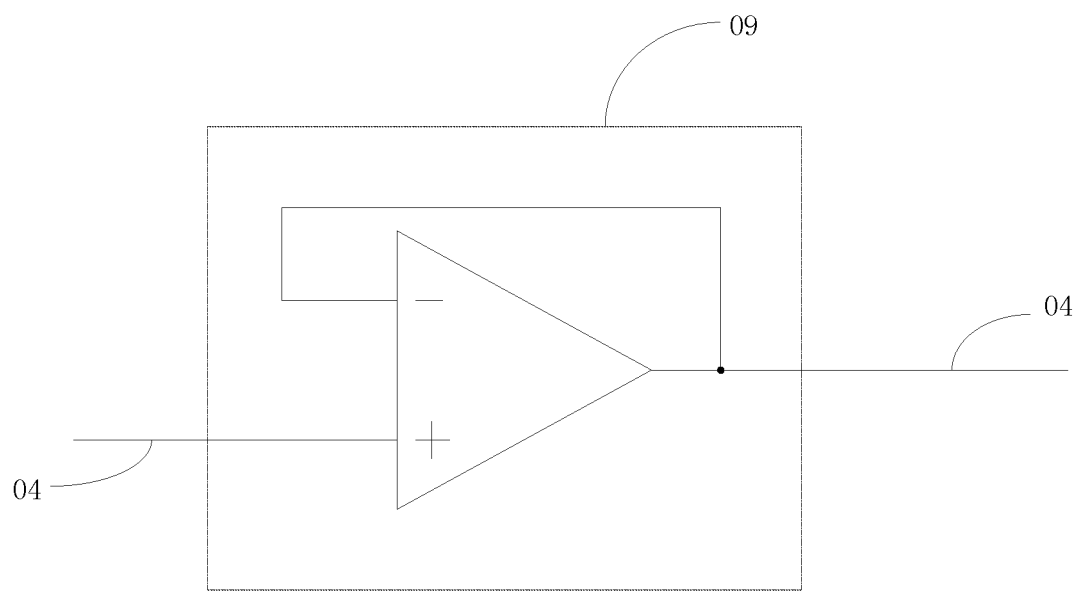
FIG. 6 is a schematic structural diagram of a voltage following circuit in a touch display screen provided by an embodiment of the disclosure.

During specific implementation, a structure of the voltage following circuit 09 may be a structure shown in FIG. 6; or certainly any circuit with a voltage stabilizing and power improving function, which is not limited herein.

Optionally, in the driving method of the touch display screen provided by the embodiment of the disclosure, when the touch display screen performs touch, the driving chip further provides the touch driving signal for the common voltage line, so that a coupling influence on the self-capacitance electrodes due to the common voltage line can be reduced.

During specific implementation, in the touch display screen provided by the embodiment of the disclosure, each of the switching transistors may be a thin film transistor or a metal oxide semiconductor (MOS) field effect transistor, which is not limited herein.

Optionally, in the touch display screen provided by the embodiment of the disclosure, each of the switching transistors may be an N-type transistor or a P-type transistor so that a fabrication process of the switching transistors can be united, process steps are reduced, and the production cost is reduced.

During specific implementation, if each of the switching transistors is the N-type transistor, the switching transistors are conducted by providing a high level signal for the control lines. If each of the switching transistors is the P-type transistor, the switching transistors are conducted by providing a low level signal for the control lines.

Taking each of the switching transistors being the N-type transistor for an example below, with reference to the sequence charts shown in FIG. 7A and FIG. 7B, working principles of the touch display screen and the driving method therefor provided by the embodiments of the disclosure are described.

Figure 7A:
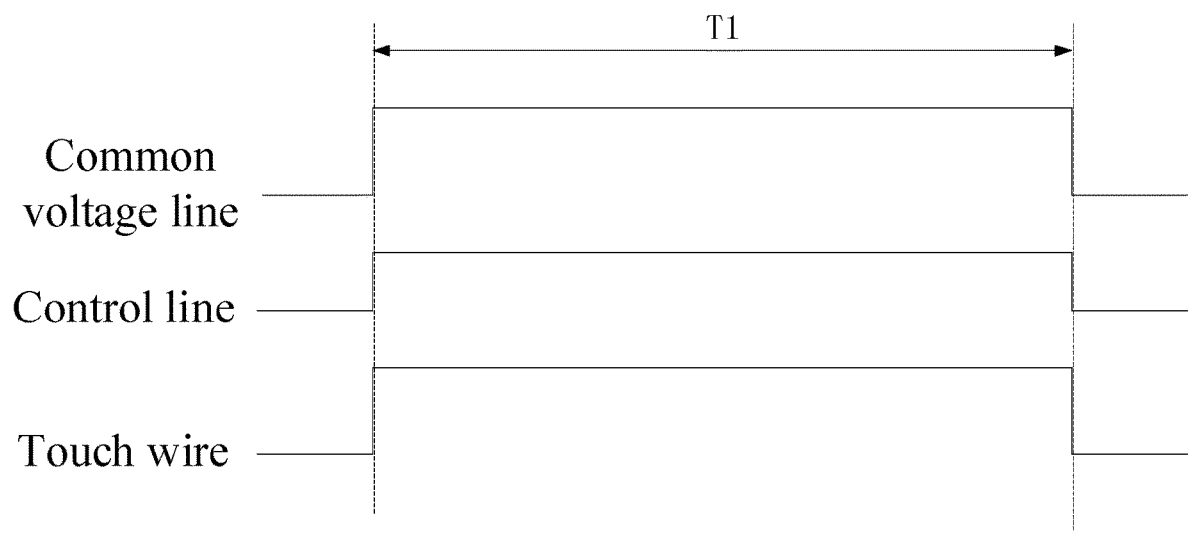
FIG. 7A is a corresponding sequence chart of a touch display screen during displaying provided by an embodiment of the disclosure.
Figure 7B:
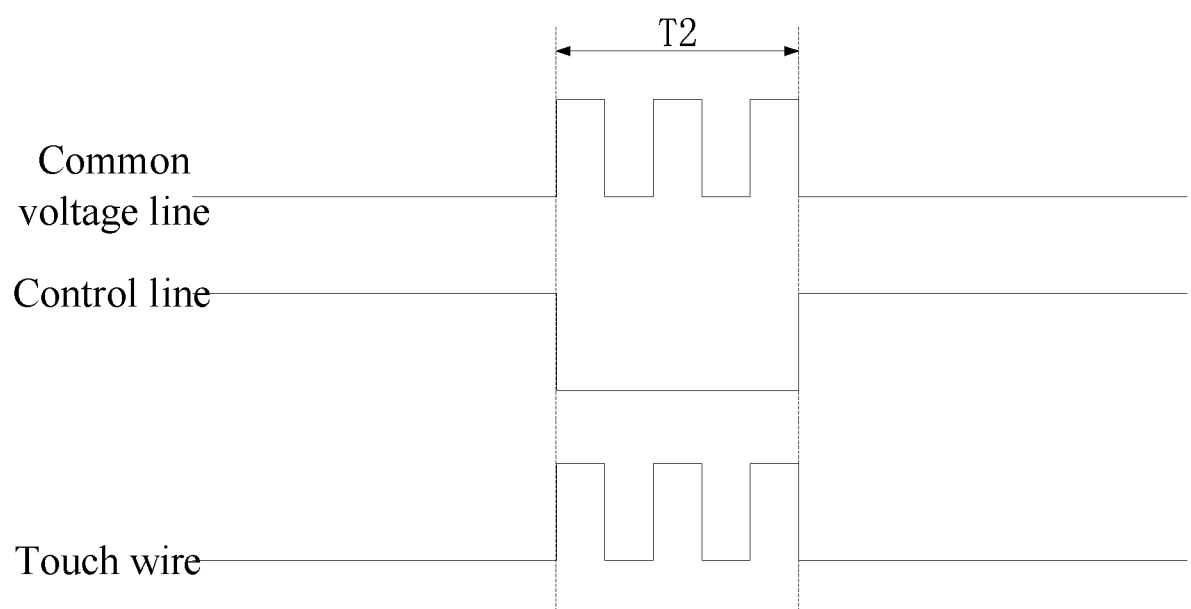
FIG. 7B is a corresponding sequence chart of a touch display screen during performing touch provided by an embodiment of the disclosure.

Specifically, as shown in FIG. 7A, when the touch display screen performs displaying (in a time period T1), the high level signal is provided for the control line 06, all the switching transistors 05 are conducted, and the common voltage signal is provided for the common voltage line 04 and each of the touch wires 03, so that displaying is realized. As shown in FIG. 7B, when the touch display screen performs touch (in a time period T2), the low level signal is provided for the control line 06, all the switching transistors 05 are cut off, the touch driving signal is provided for the common voltage line 04 and each of the touch wires 03, and the change of the capacitance value of each of the self-capacitance electrodes 02 is detected through each of the touch wires 03 so as to determine the touch position.

Optionally, in the touch display screen provided by the embodiments of the disclosure, the added switching transistors may be arranged on the same film layer, with the same function, of transistors of an original display panel. In this way, the added switching transistors are formed while the transistors of the display panel are fabricated, the process step of independently fabricating the switching transistors is omitted, and the production cost may be reduced.

During specific implementation, in the touch display screen provided by the embodiments of the disclosure, the control lines are generally electrically connected with a time sequence controller of the driving chip, and the time sequence controller may be specifically integrated into the driving chip or arranged outside the driving chip, which is not limited herein.

In general, a density of the touch screen panel is usually in a millimeter scale, therefore, during specific implementation, a density and an occupying area of the self-capacitance electrodes can be selected according to a needed touch density so as to guarantee a needed touch density, and generally, each of the self-capacitance electrodes is designed as a square electrode of about 5 mm*5 mm. A density of the display screen is usually in a micron scale, so one self-capacitance electrode generally corresponds to a plurality of pixels in the display screen.

During specific implementation, in order to conveniently partition the common electrode layer to obtain regularly arranged self-capacitance electrodes, in the touch display screen provided by the embodiments of the disclosure, the number of pixel rows to which each self-capacitance electrode corresponds is the same, and the number of pixel columns to which each self-capacitance electrode corresponds is the same.

Furthermore, the touch display screen provided by the embodiments of the disclosure may further include data lines. The extending directions of the touch wires may be the same as extending directions of the data lines.

During specific implementation, in the touch display screen provided by the embodiments of the disclosure, the touch wires and the data lines may be arranged on the same layer in an insulated mode. In this way, during fabrication, a fabrication process of the touch wires does not need to be added independently, the touch wires can be realized only by changing patterning of the corresponding film layers of original data lines, process steps are simplified, the production cost is reduced, and the production efficiency is improved.

Based on the same inventive concept, embodiments of the disclosure further provide a display apparatus, including a touch display screen provided by embodiments of the disclosure. The display apparatus may be: a mobile phone, a tablet PC, a television, a display, a laptop, a digital photo frame, a navigator and any product or component with a displaying function. Implementation of the display apparatus may refer to the embodiment of the above touch display screen, and repetitions are omitted.

According to the above touch display screen, the driving method therefor, and the display apparatus provided by the embodiments of the disclosure, the touch display screen includes: the driving chip and the common electrode layer, the common electrode layer is partitioned into the plurality of mutually independent self-capacitance electrodes, and the self-capacitance electrodes are electrically connected to the driving chip through the corresponding touch wires; the touch display screen further includes: the common voltage line, the switching transistors electrically connected with all the self-capacitance electrodes correspondingly, and the control line electrically connected with the gate electrodes of the switching transistors; and all the self-capacitance electrodes are electrically connected with the common voltage line through the corresponding switching transistors. When the touch display screen performs displaying, the driving chip controls all the switching transistors to be conducted through the control lines so that all the self-capacitance electrodes are connected in series to form a whole, and provides the common voltage signal for the common voltage line and each of the touch wires so that the common voltage signal on the different self-capacitance electrodes can be consistent and displaying uniformity can be guaranteed. When the touch display screen performs touch, the driving chip controls all the switching transistors to be cut off through the control lines so that all the self-capacitance electrodes can be mutually independent, provides the touch driving signal for each of the touch wires, and the change of the capacitance value of each of the self-capacitance electrodes is detected through each of the touch wires so as to determine the touch position.

Apparently, those skilled in the art can make various changes and transformations for the disclosure without departing from the spirit and scope of the disclosure. In this case, if the changes and transformations of the disclosure fall within the scope of the claims and their equivalents of the disclosure, the disclosure also intends to contain these changes and transformations.

What is claimed is:

1. A touch display screen, comprising:
   a driving chip;
   a common electrode layer, partitioned into a plurality of mutually independent self-capacitance electrodes, wherein the self-capacitance electrodes are electrically connected to the driving chip through corresponding touch wires;
   a common voltage line, electrically connected with the driving chip;
   a control line, electrically connected with the driving chip; and
   a plurality of switching transistors, wherein first electrodes of the plurality of switching transistors are electrically connected with the self-capacitance electrodes correspondingly, a gate electrode of each of the plurality of switching transistors is electrically connected with the control line, and a second electrode of the each switching transistor is electrically connected with the common voltage line;
   wherein the touch display screen further comprises: a voltage following circuit arranged between the common voltage line and the driving chip,
   wherein the driving chip is electrically connected with the common voltage line through the voltage following circuit.

2. The touch display screen according to claim 1, wherein the touch display screen comprises a display region and a bezel region; the self-capacitance electrodes are arranged in the display region; and the plurality of switching transistors, the common voltage line and the control line are arranged in the bezel region; and
   the touch display screen further comprises first fanout lines which are in one-to-one correspondence with the self-capacitance electrodes, and the self-capacitance electrodes are electrically connected with the first electrodes of the plurality of switching transistors correspondingly through the first fanout lines.

3. The touch display screen according to claim 2, wherein the plurality of switching transistors are arranged on a same side of the bezel region.

4. The touch display screen according to claim 3, wherein the plurality of switching transistors are arranged on a side opposite to the driving chip; and the touch wires are multiplexed as the first fanout lines.

5. The touch display screen according to claim 2, wherein the plurality of switching transistors corresponding to the self-capacitance electrodes are respectively arranged on a side of the bezel region close to the self-capacitance electrodes.

6. The touch display screen according to claim 2, wherein extending directions of the first fanout lines are identical, and the first fanout lines are arranged on a same layer.

7. The touch display screen according to claim 1, wherein the touch display screen comprises a display region and a bezel region, the self-capacitance electrodes are arranged in the display region, and the each switching transistor is respectively arranged in a region where a corresponding self-capacitance electrode is arranged;
   the common voltage line and the control line are both arranged in the bezel region; and
   the touch display screen further comprises second fanout lines which are in one-to-one correspondence with second electrodes of the plurality of switching transistors, and the second electrodes of the plurality of switching transistors are electrically connected with the common voltage line through corresponding second fanout lines.

8. The touch display screen according to claim 7, wherein extending directions of the second fanout lines are identical, and the second fanout lines are arranged on a same layer.

9. The touch display screen according to claim 8, wherein the extending directions of the second fanout lines and extending directions of the touch wires are identical, and the second fanout lines and the touch wires are arranged on the same layer.

10. A display apparatus, comprising the touch display screen according to claim 1.

11. A driving method for the touch display screen according to claim 1, comprising:

controlling, by the driving chip, each of the plurality of switching transistors to be conducted through the control line, and providing a common voltage signal for the common voltage line and each of the touch wires when the touch display screen performs displaying; and controlling, by the driving chip, each of the plurality of switching transistors to be cut off through the control line, providing a touch driving signal for each touch wire and detecting a change of a capacitance value of each self-capacitance electrode through each touch wire so as to determine a touch position when the touch display screen performs touch.

12. The driving method according to claim 11, further comprising:

providing, by the driving chip, a touch driving signal for the common voltage line when the touch display screen performs touch.

* * * * *